(12) United States Patent
Dahm

(10) Patent No.: US 7,685,824 B2
(45) Date of Patent: Mar. 30, 2010

(54) ROTARY RAMJET TURBO-GENERATOR

(75) Inventor: Werner J. A. Dahm, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 708 days.

(21) Appl. No.: 11/326,068

(22) Filed: Jan. 5, 2006

(65) Prior Publication Data

US 2007/0056290 A1 Mar. 15, 2007

Related U.S. Application Data

(60) Provisional application No. 60/715,499, filed on Sep. 9, 2005.

(51) Int. Cl.
*F02K 7/08* (2006.01)

(52) U.S. Cl. .................. 60/767; 60/39.45; 60/224; 60/729

(58) Field of Classification Search .............. 60/767, 60/224, 225, 39.43, 39.45, 726, 729, 769; 415/91, 181
See application file for complete search history.

(56) References Cited

U.S. PATENT DOCUMENTS

| 6,263,660 B1 | 7/2001 | Lawlor |
| 6,298,653 B1 | 10/2001 | Lawlor |
| 6,334,299 B1 | 1/2002 | Lawlor |
| 6,347,507 B1 | 2/2002 | Lawlor |
| 6,434,924 B1 | 8/2002 | Lawlor |
| 6,446,425 B1 | 9/2002 | Lawlor |
| 6,510,683 B1 | 1/2003 | Lawlor |
| 6,694,743 B2 | 2/2004 | Lawlor et al. |
| 2004/0020185 A1 | 2/2004 | Brouillette et al. |
| 2004/0025509 A1 | 2/2004 | Lawlor et al. |
| 2005/0039463 A1* | 2/2005 | Condevaux et al. ........... 60/776 |

OTHER PUBLICATIONS

Website: http://www.aviation-history.com/engines/ramjet.htm; "The Ramjet/Scramjet Engine"; 1 page; The Aviation History On-Line Museum; Copyright 2000.
Website: http://www.usherbrooke.ca/uilo/offers/mechanic/engine.html; "Rotary Ramjet Engine"; Universite' De Sherbrooke; 2 pages.

* cited by examiner

*Primary Examiner*—Michael Cuff
*Assistant Examiner*—Phutthiwat Wongwian
(74) *Attorney, Agent, or Firm*—Howard & Howard Attorneys PLLC

(57) ABSTRACT

A Brayton-cycle rotary ramjet engine (10) operated within the confines of a helically elongated pass-through duct formed between a preferably stationary radially outward surface (14) and an outer rotating flow channel (36). The flow channel (36) is contoured between its inlet (34) and outlet (38) to include a supersonic diffuser (40), a combustor (42) and an expansion nozzle (44). Gaseous fuel, or liquid fuel atomized by a fuel slinger (58) within a housing (46), or solid fuel in the form of fine particulates, is inter-mixed with an oxidizer prior to being directed to the flow channel inlets (34). The air and fuel are combusted in the flow channels (36) and exhausted through the rear of the housing (46). A generator (22) can be coupled to a power shaft (18) to convert net shaft power into electricity. Preferably, the rotor (24) and stator (12) are fabricated from a ceramic or other high-temperature material so that combustor exit temperatures ($T_3$) can be operated at highly efficient levels.

17 Claims, 6 Drawing Sheets

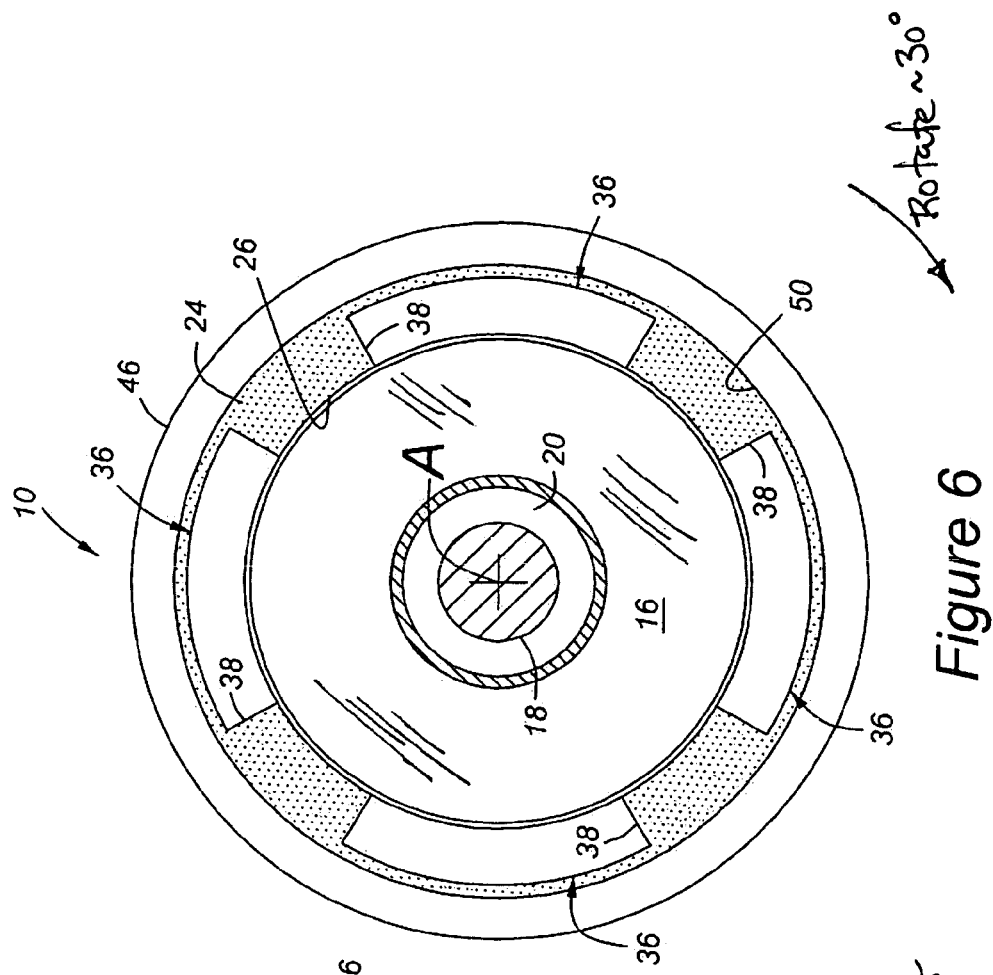
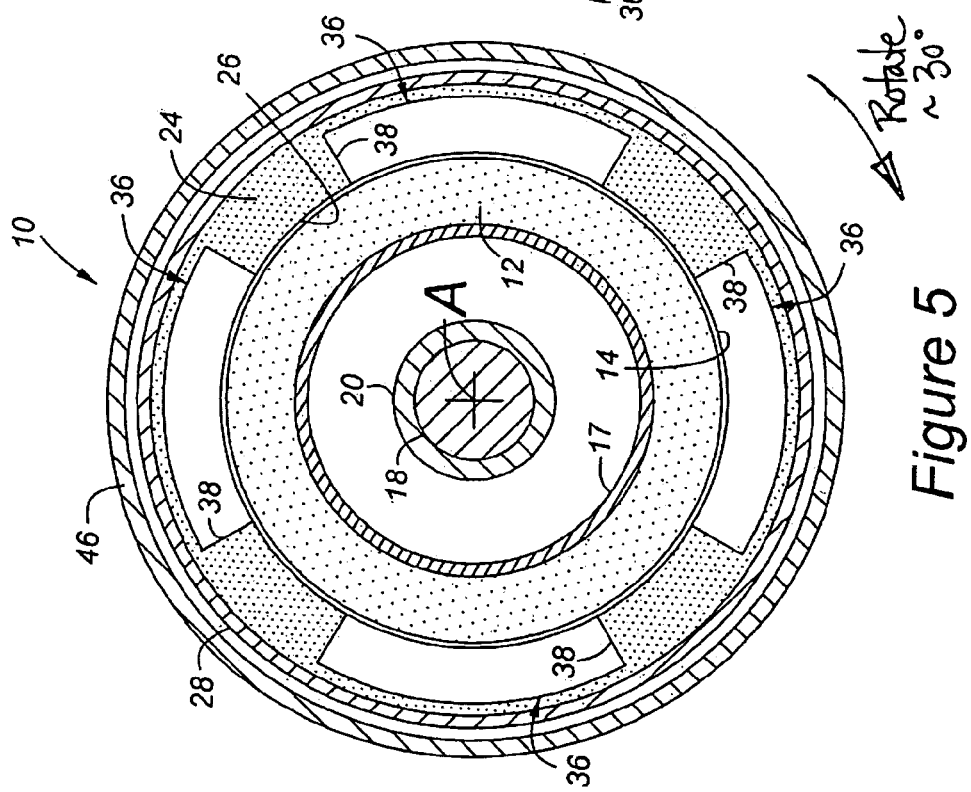

ROTARY RAMJET TURBO-GENERATOR

CROSS-REFERENCE RELATED APPLICATIONS

This application claims priority to U.S. Provisional Application No. 60/715,499 filed Sep. 9, 2005.

BACKGROUND OF THE INVENTION

1. Field of the Invention

The invention relates generally to a gas turbine engine/generator, and more particularly toward a rotary ramjet turbo-generator.

2. Related Art

In a traditional Brayton-cycle gas turbine engine, a bladed compressor first compresses air, which then mixes and burns with a fuel like jet fuel, kerosene, natural gas or propane in a combustor. The heat that comes from the burning fuel expands the combustion product gases. As these hot product gases flow at high speed through a bladed turbine, a torque is produced on a turbine shaft. The torque is used to drive the compressor and possibly one or more external implements like a generator. These conventional Brayton-cycle engines require a bladed compressor, driven by a bladed turbine, to achieve the high compression ratios needed for acceptable operating efficiencies and power output. Most of the mass in such a conventional system results from the bladed compressor and turbine, which in turn limits the mass-specific power achievable. It has been a long-standing goal to develop more effective ways of obtaining substantially higher mass-specific power for Brayton-cycle engines.

Additionally, the need for a bladed compressor and turbine introduces severe limits on the performance of a conventional gas turbine engine. These limits stem from the high-temperature material limitations associated with the first-stage turbine blades. In particular a bladed turbine must be made from a material with good mechanical properties but relatively poor thermal properties which in turn imposes strict limits on the maximum turbine inlet temperature, and thus on the maximum combustor exit temperature. The maximum combustor exit temperature is commonly labeled $T_3$ on a traditional temperature-entropy (T-s) diagram for the Brayton cycle. This practical limitation imposed by the material characteristics in the first-stage turbine blades lowers both the thermal efficiency and the power achievable from the conventional approach. It has thus been a further long-standing goal to develop effective ways to allow continuous operation of Brayton-cycle engines with substantially higher $T_3$ values to provide both increased thermal efficiencies and further increased mass-specific power.

Furthermore, there has been interest in miniaturizing Brayton-cycle engines for various small-scale applications. However, miniaturization of conventional, large-scale turbine engines while maintaining comparably high operational performance has to date proven difficult. Most engineering issues encountered in large-scale gas turbines, such as the need to maintain acceptable compressor and turbine blade tip clearances, are even more difficult to address at small scales. The need for high-efficiency multi-stage bladed compressors and turbines also contributes significantly to the complexity and overall cost of producing small-scale turbine engines and generators based on miniaturization of conventional large-scale systems, and furthermore ultimately limits the service life of such engines. Current small-scale Brayton-cycle engines based on miniaturization of conventional large-scale gas turbine engines have been demonstrated to achieve substantially lower thermal efficiencies and mass-specific power than to their large-scale counterparts. It has thus been a further long-standing goal to develop effective ways to miniaturize Brayton-cycle engines to achieve higher performance, longer life, and lower cost than have to date been possible by direct miniaturization of traditional large-scale gas turbine engines.

In contrast to a traditional gas turbine engine, a traditional ramjet engine has no moving parts, and in particular has no bladed compressor or turbine. While also operating on a Brayton-cycle, the ramjet engine instead achieves compression of intake air by the ram pressure that develops from the relative difference in velocity between the engine and the intake air. A conventional ramjet engine consists of a specially shaped flow channel that is open at both ends, with the air used for combustion being rammed into the flow channel and compressed by the high forward motion of the engine relative to the surrounding air. The air entering this channel flows first through a diffuser section where, at initially supersonic velocities relative to the flow channel, compression takes place. The air speed is reduced to subsonic velocities before reaching the end of the diffuser section, whereupon it enters a combustor section in which it is mixed and burned with gaseous or atomized liquid fuel. The resulting hot combustion product gases continue flowing from the combustor into a nozzle section, where they expand through a supersonic nozzle to finally issue at supersonic velocity in a jet from the rear opening of the channel. The difference in the total momentum flow rate of the air and fuel entering the ramjet flow channel and the combustion product gases issuing from the rear opening of the flow channel produces a thrust force directed generally along the direction of the flow through the flow channel.

Thus, in the context of conventional ramjet engines, the use of an appropriately shaped supersonic diffuser and an appropriately shaped supersonic nozzle eliminates the need for a conventional bladed compressor and turbine, providing the benefits noted above. A further advantage of the ramjet engine arises out of the fact that its relatively simple flow channel shape can be more easily fabricated from high-temperature materials, such as, for example, ceramic materials that permit higher operating temperatures and thus greater efficiencies. However, conventional ramjet engines can only be used when the forward speed of the engine is sufficiently high relative to the surrounding air to produce suitable ram pressure which is needed for acceptable performance.

To overcome this practical limitation, rotary ramjet-based engines have been proposed as turbo generators for applications that include large-scale stationary power generation at up to about 9 megawatts using methane, waste gases, or other fuels. For example, numerous patents assigned to Ramgen Power Systems, Inc. of Bellevue, Wash. teach various ways in which to operate a large-scale rotary ramjet engine. Representative examples include Ramgen's U.S. Pat. Nos. 6,263,660 and 6,347,507, both in the name of Lawlor. Another exemplary source for large-scale rotary ramjet teachings may be found in US Patent Publication No. 2004/0020185 to Brouillette and Plante.

These prior art systems configure the compression-combustion-expansion channels that provide the ramjet flow path in a helical shape. These twisting flow channels are formed by an appropriately shaped radially outward surface of an inner supersonic rotating rotor that faces toward the radially inward surface of an outer stationary stator. Providing for only a small gap between these surfaces causes the flow channels formed from the radially outward surface of the rotor to be operably closed against the radially inward surface of the stator. This creates ramjet channels that remain operably open only at their upstream and downstream ends. By turning the rotor about its central axis at a sufficiently high rotation rate, the radially outward facing ramjet channels within the rotor move at sufficiently high supersonic speed relative to air, which is separately forced to flow axially at much lower speed toward the rotor and into the ramjet channels, to achieve sufficient ram pressure and accomplish ramjet performance. In principle, such prior art configurations for rotary ramjet engines eliminate the need for a bladed compressor and turbine in a stationary system. As such, they would appear to permit substantial improvements in the thermal efficiency, mass-specific power, service life, and cost of a Brayton-cycle engine as compared with its bladed cousin.

However, the prior art rotary ramjet configurations have numerous disadvantages that have to date prevented successful realization for lack of useful operating performance. Most notably, the rotor material within which the ramjet flow channels are formed is subjected to large tensile stresses similar to those experienced by a bladed turbine engine. These large stresses are the result of the radially outward orientation of the working surface of the rotor and the large centrifugal forces produced by the rotor motion. These tensile stresses arise because the rotor material is not constrained at its radially outermost surface from expanding radially outward under the large centrifugal forces that act on it. Just like in a bladed turbine engine, the resulting large tensile stresses in the rotating parts of a ramjet engine prevent high-temperature materials from being used to fabricate the rotor used in the ramjet flow channel because the ceramic material would likely fail in tension mode.

The desirable high-temperature materials spoken of here might include ceramics, ceramic-metallics, and similar materials that can withstand far higher temperatures than conventional turbine materials without substantially losing their material strength. A further characteristic of the desirable high-temperature materials is that they typically have far greater compressive strength than tensile strength, and in particular fail far more readily in tension than do the kinds of materials found in conventional bladed turbine engines. For this reason, conventional materials with high tensile strength are used in prior art to form the flow channels in a rotating ramjet system. The trade-off is unfortunate, because higher tensile strength materials cannot sustain high-temperatures, and therefore the maximum combustor exit temperatures ($T_3$) which can be sustained in the prior art systems are substantially low relative to a stoichiometric ideal. Since the combustor exit temperature is a key factor in determining the power output and efficiency of a Brayton-cycle engine, the inability to use high-temperature materials (like ceramics) is a serious disadvantage of all prior art systems.

Accordingly, there is a need within the rotary ramjet engine field to enable the use of high-temperature materials, such as ceramics or ceramic-metallics and thereby allow operation at higher combustor exit temperatures ($T_3$), which in turn will allow higher mass-specific power and higher thermal efficiency than are possible with conventional gas turbine engines or with prior art rotary ramjet engines.

SUMMARY OF THE INVENTION AND ADVANTAGES

The subject invention comprises an "inside-out" Brayton-cycle rotary ramjet engine including a stator having a generally annular, radially outward surface centered about a central axis. A rotor is rotatably supported about the central axis and concentrically axially aligned with the radially outward surface of the stator. The rotor includes at least one helically extending ramjet flow channel formed therein. The flow channel has an axially forward inlet and an axially rearward outlet, and contoured features between the inlet and the outlet forming respective diffuser, combustor and nozzle sections therealong when enclosed along their helical length by the adjacent radially outward surface of the stator. The improvement comprises the flow channel in the rotor being disposed radially outwardly of the radially outward surface of the stator such that the rotor orbits about the central axis positioned on the radially outward surface during operation of the engine.

By reversing the relative positions of the rotor and stator in comparison to the prior art rotary ramjet teachings, it becomes possible to fabricate the rotor from materials capable of withstanding higher temperatures than those achievable in prior art designs. In practical terms, this "inside-out" orientation of components, wherein the rotor is positioned about the exterior of the stator, facilitates higher thermal efficiency, greater mass-specific power, longer service life, and reduced fabrication cost relative to conventional gas turbine engine teachings and relative to prior art rotary ramjet engine teachings. These advantages are realized in applications of any scale, and the novel arrangement facilitates miniaturization of a rotary ramjet engine in applications where miniaturization would be advantageous.

The invention also comprises a method for operating an inside-out Brayton-cycle rotary ramjet engine within the confines of a helically elongated pass-through combustion chamber formed between a preferably stationary radially outward surface and a rotating flow channel. The method comprises the steps of fixedly supporting the radially outward surface about a central axis, rotatably supporting a helical ramjet flow channel about the central axis and concentrically axially aligned with the radially outward surface, and rotating the flow channel in a circular path positioned on the exterior of the radially outward surface. For the reasons stated above, by orbiting the rotor so that it is positioned about the exterior of the stator, i.e., by employing this "inside-out" design, greater engine efficiencies can be achieved through the use of desirable materials which have high operating temperature capabilities. This results in dramatically higher thermal efficiency, greater mass-specific power, longer service life, and reduced fabrication cost relative to conventional gas turbine engines and relative also to prior art rotary ramjet engines. These novel concepts are adaptable in applications of any scale, and facilitate miniaturization of the rotary ramjet engine if desired.

BRIEF DESCRIPTION OF THE DRAWINGS

These and other features and advantages of the present invention will become more readily appreciated as the same becomes better understood by reference to the following detailed description when considered in connection with the accompanying drawings, wherein:

FIG. 5 is a cross-sectional view taken generally along lines 5-5 in FIG. 2;

FIG. 6 is a cross sectional view taken generally along lines 6-6 in FIG. 2;

DETAILED DESCRIPTION OF THE PREFERRED EMBODIMENT

Figure 1:
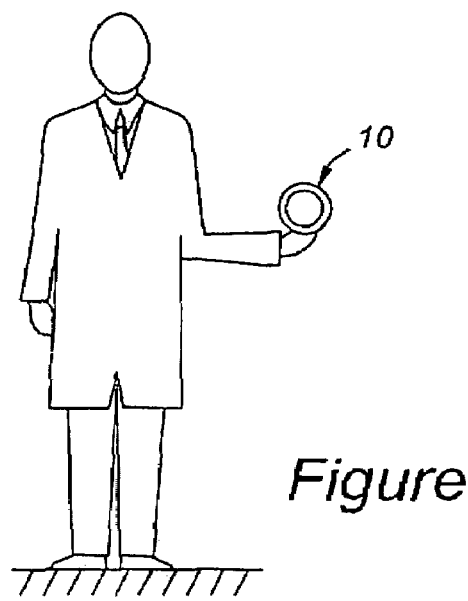
FIG. 1 is an exemplary view depicting the relatively small scale to which a ramjet turbo engine according to the subject invention can be made.
Figure 2:
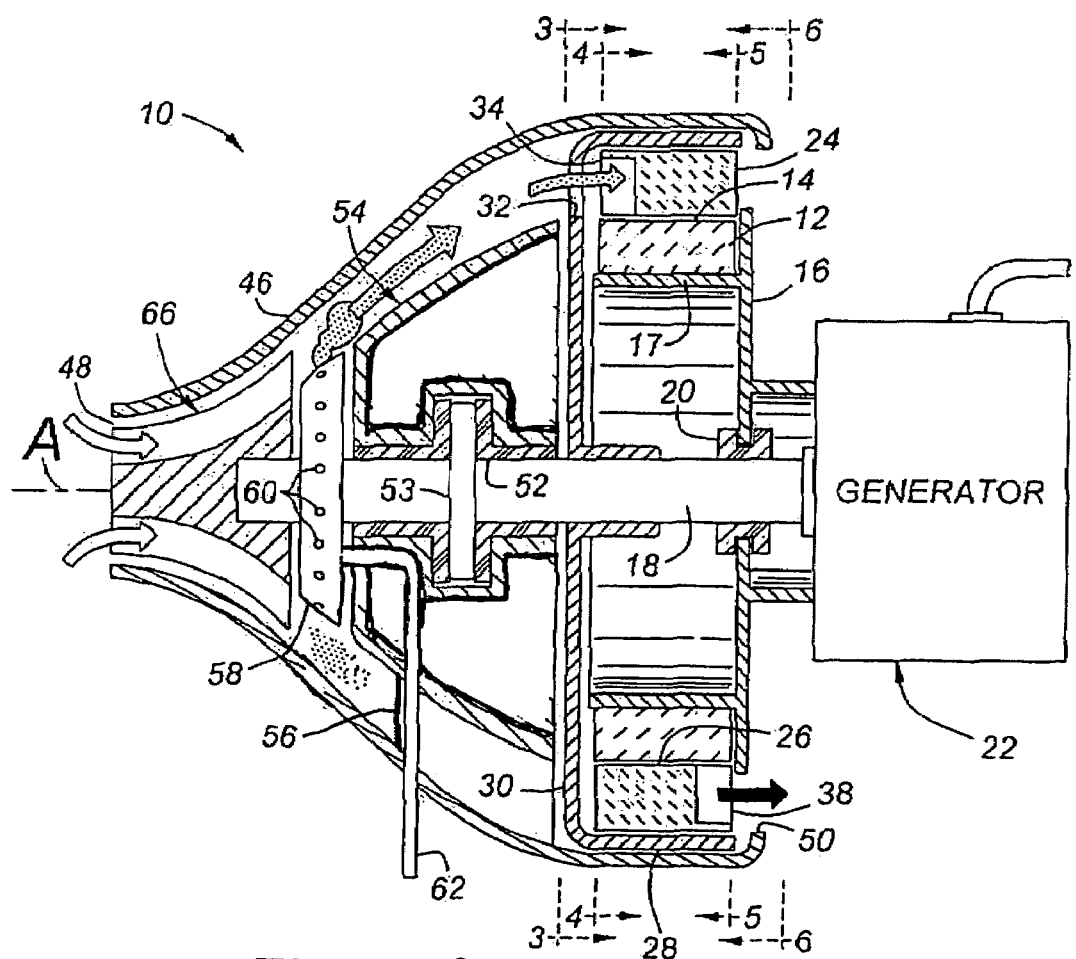
FIG. 2 is a simplified cross-sectional view of a rotary ramjet turbo-generator according to the subject invention.
Figure 4:
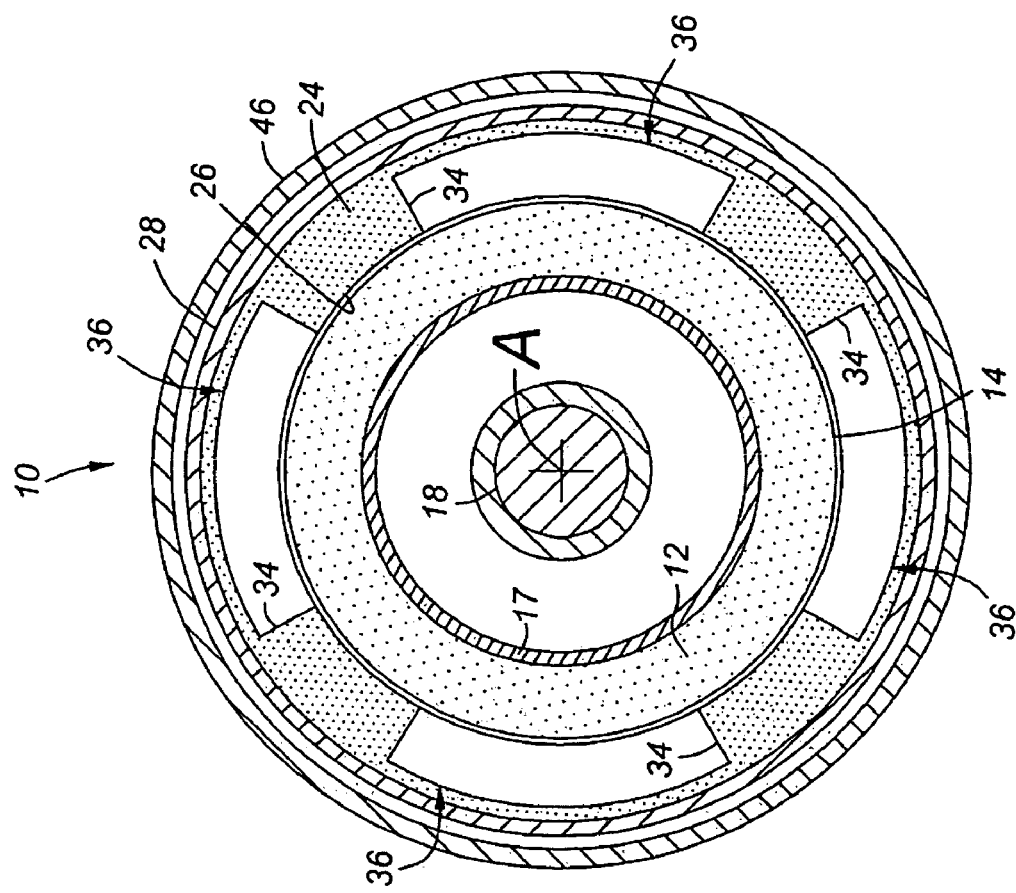
FIG. 4 is a cross-sectional view taken generally along lines 4-4 in FIG. 2.
Figure 3:
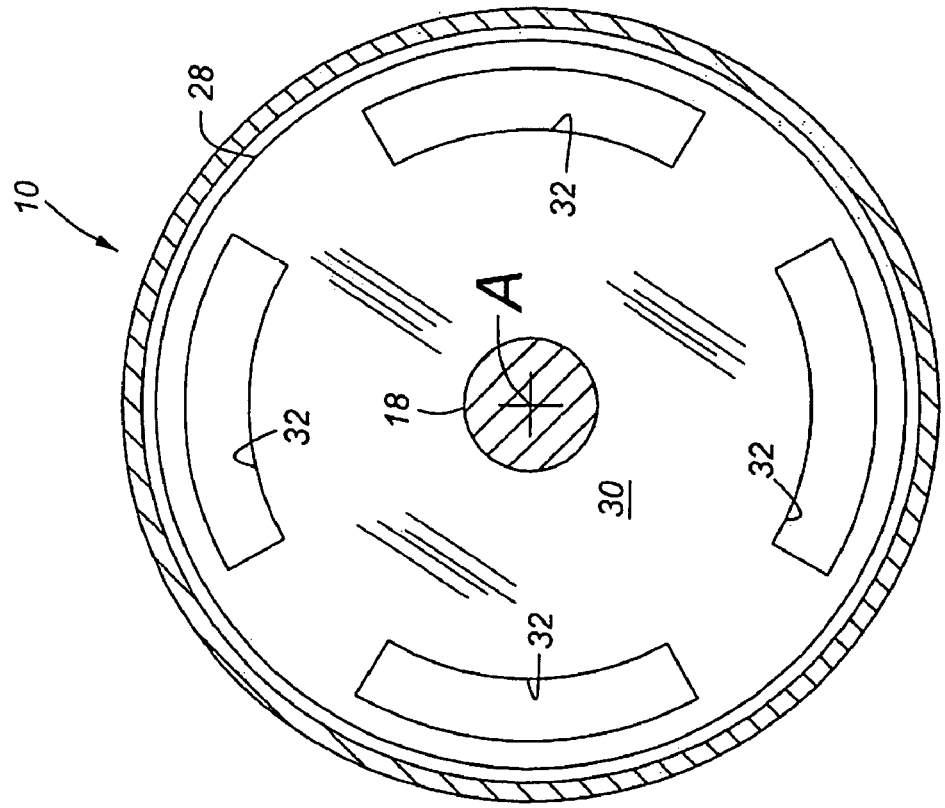
FIG. 3 is a cross-sectional view taken generally along lines 3-3 in FIG. 2.

Referring to the Figures, wherein like numerals indicate like or corresponding parts throughout the several views, an inside-out Brayton-cycle rotary ramjet engine according to the subject invention is generally shown at 10 in FIGS. 1 and 2. The ramjet engine 10 is of the type which can be scaled to fit any application, from large-scale power generation units producing electricity in the megawatt ranges, to small-scale engines and turbo-generators producing less than 1000 watts shaft power. The engine 10 includes a stator 12 which has a generally annular, radially outward surface 14 centered about a central axis A. In the preferred embodiment, the stator 12 is stationary, but could be configured to rotate with or against the rotor 24. This outward surface 14 of the stator 12 may be generally cylindrical, as depicted in the Figures, or may be conically tapered or contoured in some fashion to provide optimal performance. Preferably, the stator 12 comprises a ring-like construction of high-temperature material, such as ceramic or ceramic-metallic material, which is supported on a stator frame 16. The stator frame 16 may be manufactured from a metal or other advantageous substance and designed to rigidly support the stator 12 in its centered condition about the central axis A. As shown in FIG. 2, the frame 16 may include a generally radial back wall forming an axial backstop for the stator 12, and a cantilever annular support ledge 17 upon which the stator 12 is mounted. This configuration is, however, readily adaptable to suit the need.

A power shaft 18 is rotatably supported along the central axis A, and is journaled in the back wall of the stator frame 16 by a bearing 20 or a bushing or other rotary mount. The shaft 18 is shown in the Figures as a simple straight member, however it can take any known form including a stepped configuration and/or offset through the use of gears or other power transmission devices. In FIG. 2, the shaft 18 is shown operatively connected to a generator, which is generally indicated at 22. In the preferred embodiment, the subject engine 10 is deployed as a power generation device, however the generator 22 can be substituted for other working components or machinery including, for example, an airplane propeller, ducted fan, or any other suitable device. The generator 22 can be used at start up as a motor to drive the shaft 18 to a moderate rotation speed until such time as the engine 10 can be spun-up to a nominal operating point.

Referring again to FIG. 2, the engine 10 is shown further including a rotor 24 which is rotatably supported about the central axis A via a direct connection to the shaft 18. The rotor 24 is concentrically and axially aligned with the radially outward surface 14 of the stator 12 so that it can orbit about the central axis A positioned around the exterior of the surface 14 during operation of the engine 10. The radially innermost surface 26 of the rotor 24 complements the radially outward surface 14 of the stator 12 so that a precise, close tolerance is maintained between the two components as the rotor 24 spins about the exterior of the stator 12. Thus, if the radially outward surface 14 is cylindrical as depicted in the Figures, the radially innermost surface 26 of the rotor 24 is also cylindrical. By contrast, if the surface 14 were formed on a taper, the surface 26 would be formed on a complementary taper, and so forth.

The rotor 24 can be formed from any suitable material but is preferably made of a high-temperature material such as ceramic, ceramic-metal, or any other of the available high-temperature/high-performance materials. In order to establish the rigid connection between the rotor 24 and the power shaft 18, a spool 28 is provided within which the rotor 24 is securely attached. The spool 28 is preferably made from a metal or other high tensile strength material, and affixed to the outer circumference of the rotor 24 so that when the rotor 24 is in high speed rotary operation, centrifugal forces acting on the rotor 24 are transferred to the encircling structure of the spool 28. Thus, whereas the high-temperature material that forms the rotor 24 may be incapable on its own of withstanding the centrifugal expansion forces resulting from high speed rotation, the spool 28 acts as a rim or belt, constraining the rotor 24 and acting as a radially outward backstop so that the rotor 24 material is prevented from being subjected to excessive tensile stress during operation. The spool 28 includes a centerfield 30 which joins fixedly to the shaft 18 by any suitable connection method, including press fit, keyed or splined fit, welding, mechanical fastening, or the like. Thus, the rotor 24 rotates together with the shaft 18 in this preferred embodiment. However, it will be appreciated that a gearing arrangement or other device could be interposed between the rotor 24 and shaft 18 so that a 1:1 ratio between their respective rotations is altered by some advantageous proportion.

Referring now to FIGS. 3 through 10, the centerfield 30 is shown including four arcuate windows 32 through which the working fluid is passed. The oxidizer component of the working fluid is to be generally understood to be a gas or mixture of gases that might include air, oxygen-enriched air, pure oxygen, or any other suitable oxidizing reactant. Each window 32 corresponds with an axially forward inlet 34 to a flow channel, generally indicated at 36, within the rotor 24. The window 32 for each flow channel 36 is aligned with the corresponding axially forward inlet 34 to provide a well-defined entrance to the flow channel 36. In the example depicted, four such flow channels 36 are formed in the rotor 24, each flow channel 36 extending helically from the respective axially forward inlet 34 to respective axially rearward outlet 38 on the rearward side, i.e., opposite the centerfield 30. The flow channels 36 are thus recessed radially outward from the inner surface 26 of the rotor 24, and extend front to rear from an axially forward inlet 34 to an axially rearward outlet 38. Although four flow channels 36 are depicted in the Figures, it will be appreciated that any number of flow channels 36 (and corresponding windows 32) can be deployed, depending upon the engine 10 scale and other constraints. Preferably more than one flow channel 36 is used and the plurality of flow channels 36 are arranged as discrete, non-intersecting formations disposed in preferably equal circumferential increments about the central axis A.

Figure 10:
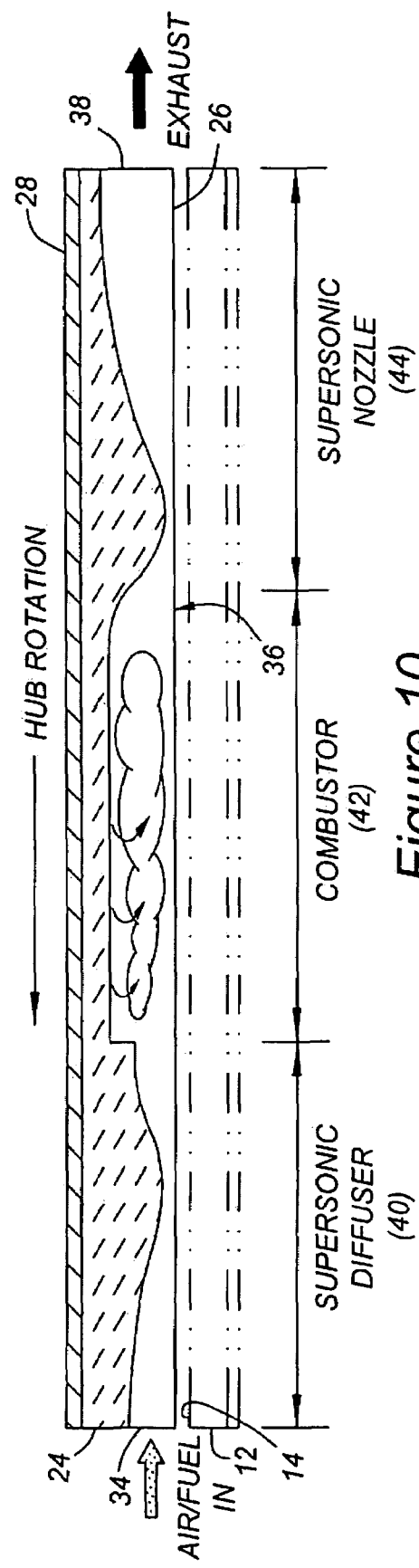
FIG. 10 is a cross-sectional view taken generally along lines 10-10 in FIG. 9 and showing the rotor in phantom along with legends corresponding to the diffuser, combustor and nozzle sections along the length of the ramjet flow channel.

Bounded by the close proximity of the radially innermost surface 26 of rotor 24 to the annular radially outward surface 14 of stator 12, each flow channel 36 includes a radially outermost inner surface 90 opposing the annular radially outward surface 14 of the stator. The radially outermost inner surface creates a ramjet flow path in which is formed a diffuser 40, a combustor 42 and a nozzle section 44. Skilled persons in the art of ramjet flow path design know the general geometric features that define each of these sections, as well as the requirements for joining these sections into a proper ramjet flow path. These different sections are illustrated in FIG. 10, and according to well-known principles of ramjet engine construction establish a varying-area ramjet duct geometry capable of providing near-isentropic gas dynamic compression, heat addition via combustion, and near-isentropic gas dynamic expansion to form a high-efficiency Brayton-cycle system. Thus, the working fluid entering through the axially forward inlet 34 encounters the ramjet flow channel 36 moving at a speed relative to the fluid that is sufficiently above the speed of sound (Mach 1.0) at that point in the fluid. The working fluid thus travels along the flow channel 36 and in so doing encounters a geometrical contour of the radially outermost inner surface 90 which functions as a supersonic diffuser 40 that causes the fluid pressure to increase and the Mach number to decrease as the fluid progresses through the diffuser 40.

Immediately following the diffuser 40, a combustor 42 is created by an appropriately-shaped geometrical configuration designed to provide flame stabilization for combustion of the reactant mixture occurring therein. Combustor 42 may be any type capable of providing effective combustion of the fuel and oxidizer components in the working fluid, including for example a dump combustor, a bluff-body combustor, a vaned combustor, a catalytic combustor, or any other suitable combustor. Flow speeds within the combustor 42 are preferably sufficiently high to provide for high Reynolds number turbulent flow and combustion to give reaction times substantially faster than would apply for simple laminar flow and combustion. The specific shape of the combustor 42 may be designed to provide large-scale flame-vortex interactions that can assist in transporting the flame surface across the combustor 42 on a time scale which is substantially faster than the nominal transit time of the working fluid through the combustor 42. Although not shown, the combustor 42 may make use of a catalyst as a pilot to assist in flame stabilization and allow for dramatically expanded lean blowout limits.

The nozzle section 44 is shaped to provide near-isentropic expansion of the combustion product gases entering from the combustion section 42 to the exhaust pressure at axially rearward outlet 38 that produces net reaction thrust along the azimuthal direction as the combustion gases exit through the axially rearward outlets 38. This creates a net torque, consisting of the torque produced by thrust from the flow channels 36, the opposing torque produced by friction with the air on the surfaces of the centerfield 30, spool 28, and rotor 24, and any torques produced by mechanical friction or other sources. The resulting net torque balances the electromagnetically-induced resistive torque produced by the generator 22 (or other component driven by the shaft 18) to produce a resulting steady-state rotation rate.

The combustor 42 is operated at the maximum temperature sustainable by the materials forming the combustor 42 and the nozzle 44 throat, where heat loads are highest. The ability to use high-temperature materials for the flow channels 36 in the present invention will thus allow maximizing the combustor 42 exit temperature, denoted herein by $T_3$, at which engine operation can be sustained and practiced.

The subject invention stands in contrast to a traditional turbine engine with blade structures in the compressor and turbine sections. By eliminating the traditional turbine blade structures via the ramjet engine approach, and by deploying a simple nozzle 44, significantly greater structural integrity is provided and thus higher maximum temperatures can be achieved in comparison to a conventional gas turbine engine. These higher maximum temperatures ($T_3$) provide for increased thermal efficiency over conventional gas turbine engines. This, together with the mass reduction from eliminating the traditional bladed compressor and turbine sections in a gas turbine engine, provides a key advantage of the subject invention.

Referring again to FIG. 2, the engine 10 is shown including a protective housing 46, which preferably surrounds the rotor 24 to encapsulate the rotating components and also provides beneficial air handling characteristics. The housing 46, which can take many different forms and is not limited to the inverted funnel shape depicted, is provided with an upstream air intake 48 and an open exhaust end 50. The housing 46 is preferably fixed relative to the stator 12 and the stator frame 16 and may be connected directly thereto. The housing 46 may also be supported on the rotating shaft 18 through a bearing arrangement 52 which includes both radial and thrust components. Thus, the shaft 18 may be provided with a flange 53 which is captured within the bearing 52 to help stabilize the housing 46 to provide an axial reaction mechanism vis-à-vis thrust forces produced by the combustion process within the rotor 24. Of course, other configurations and arrangements of components can be designed to address the need for a thrust bearing within the construction to accommodate axial reaction forces produced by combustion processes within the rotor 24.

Figure 11:
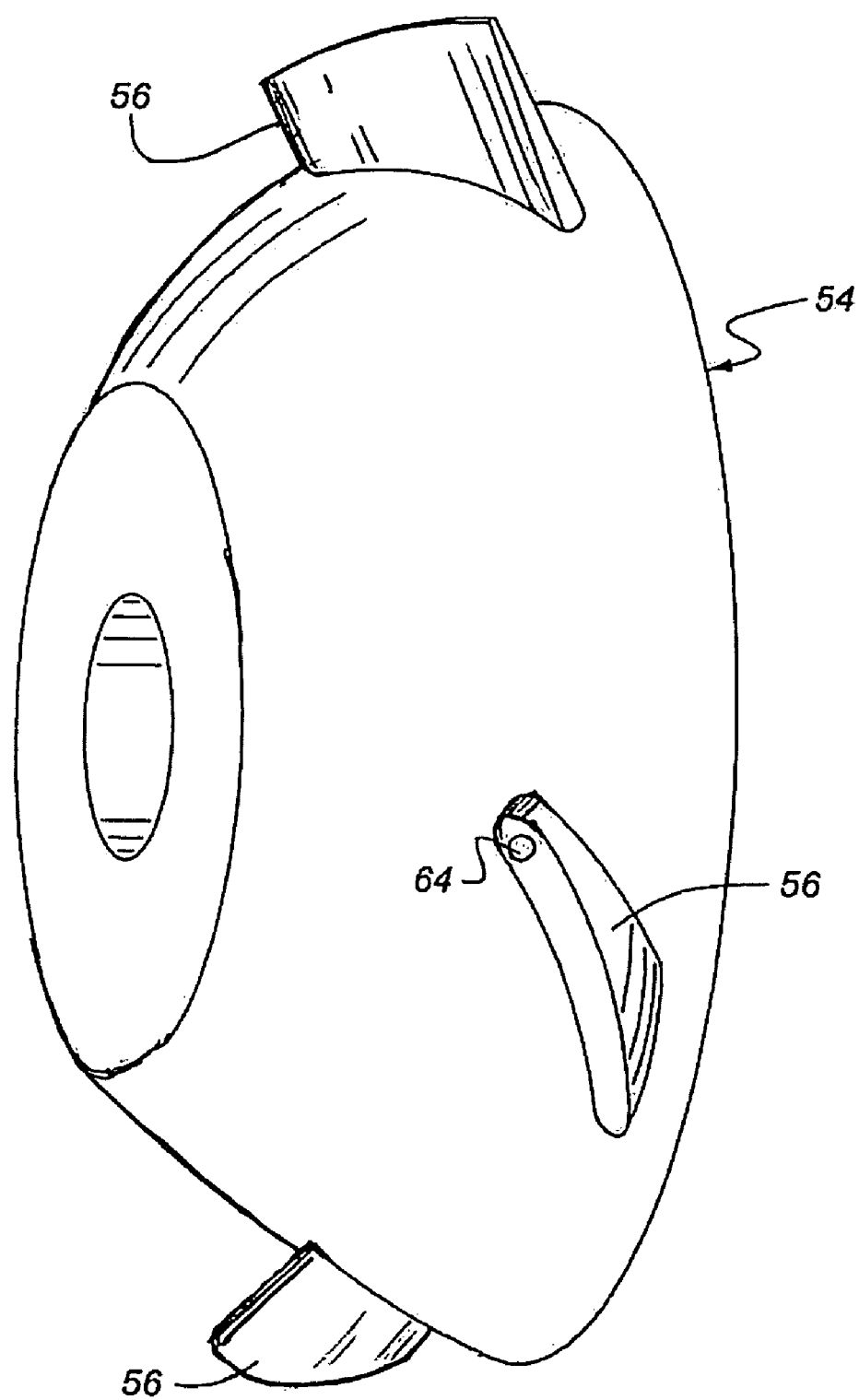
FIG. 11 is a simplified perspective view showing one embodiment of a spacer in which its struts support the spacer within the housing and are configured to function as guide vanes to help control the flow of air entering the ramjet flow channels.

In the exemplary embodiment, bearings 52 are housed within a stationary spacer, generally indicated at 54. The spacer 54 has an outer surface that is preferably fared to assist separately or in conjunction with the housing 46 in leading the working fluid toward the windows 32 and the spool 28. As perhaps best shown in FIG. 11, the spacer 54 can be provided with a plurality of stationary radial supports 56 which extend rigidly to the housing 46 and thus securely hold the housing 46 in a centered position. The radial supports 56 can have any shape, but preferably are curved or otherwise angled so as to induce swirl in the working fluid as it moves toward the flow channels 36. Ideally, these radial supports 56 are shaped like guide vanes with a helical twist or angled slant that generally corresponds to the incoming lead angle of each flow channel 36 so that fluid directed at the flow channels 36 is aligned in a generally parallel direction relative to the incoming lead angle of each flow channel 36. By this method, the working fluid is more efficiently directed into the flow channels 36 where it can be compressed, combusted and exhausted according to the ramjet process described above in connection with FIG. 10.

At some point, fuel must be mixed with an oxidizer component of the working fluid. This can be accomplished in a variety of ways, depending in part on the nature of the fuel supplied to the engine 10. The fuel could be any fuel or mixture of fuels capable of combustion with the oxidizer in the combustor 42, including gaseous fuels, liquid fuels, or even sufficiently fine particulates of solid fuels. In the exemplary embodiment depicted in FIG. 2, liquid fuel is atomized by a fuel slinger 58 which is operatively coupled to the shaft 18 immediately upstream of the spacer 54. The fuel slinger 58 can, itself, take many forms, but in the illustrated embodiment is a rotary centrifugal atomizer comprising a cup-like structure having holes 60 or serrated edge to break the liquid fuel into tiny droplets under the centrifugal force created by high speed rotation with the shaft 18.

The liquid fuel in this example is fed onto the back side of the slinger 58 by a feed tube 62 which may, further for example, pass through a hole 64 in one of the radial supports 56 of the stationary spacer 54. Of course, other fuel feeding arrangements can be used. As an alternative example, the fuel could be introduced directly into the flow channels 36, and especially in or just upstream of the combustor 42. As a further alternative example, the fuel in either gaseous form, in atomized droplet form, or in fine solid particulate form can be mixed with the incoming oxidizer prior to being caused to enter through the intake 48 of the housing 46. The oxidizer passing around the outer surface of the spacer 54 is thus mixed with the fuel and carried together into the flow channels 36. One advantage of the fuel slinger 58 is that it removes the need for a high-pressure fuel pump such as used in conventional fuel injection systems typically found on large-scale engines. Thus, the fuel slinger 58 contributes to an overall reduction in system mass, cost and complexity. The overall stoichiometry of the fuel and oxidizer mixture is controlled by the liquid fuel flow rates supplied to the engine 10, which allows the combustor 42 exit temperature ($T_3$) to be varied as needed.

The engine 10 may be further provided with an impeller, generally indicated at 66, operatively coupled to the shaft 18 for forcibly moving the air or other oxidizer toward the axially forward inlets 34. In FIG. 2 the impeller 66 is shown enclosed within the housing 46, proximate the intake 48 and upstream of the fuel slinger 58. However, other configurations for oxidizer induction into engine 10 may be substituted, including an exterior mounted fan, an air pump, a naturally aspirated system, or even a direct connection to a high-pressure oxidizer source. In the preferred embodiment depicted, the use of the impeller 66 can be beneficial to feed oxidizer into the engine 10 while at the same time proportioning the overall axial oxidizer flow to the rotation rate of the rotor 24. The azimuthal velocity of the entrance point to the flow channels 36 is also proportional to the rotation rate of the shaft 18, and thus of the impeller 66. Consequently, the angle at which the air/fuel mixture enters the flow channels 36 in the rotor 24 is set by the ratio of the axial and azimuthal velocities. Through proper choice of impeller 66 geometries, this angle can be made to match the helical twist angle of the flow channels 36 so that the air-fuel mixture enters the flow channels 36 in such a way as to minimize pressure losses and other detrimental effects that would otherwise result from flow misalignment.

Figure 8:
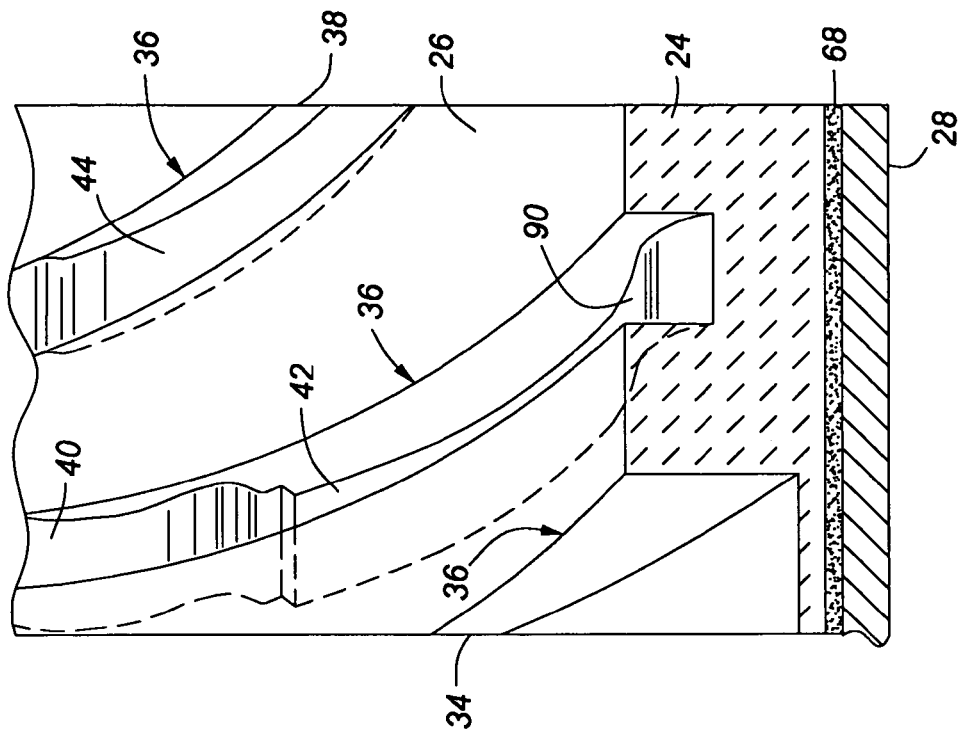
FIG. 8 is a fragmentary cross-sectional view taken generally along lines 8-8 in FIG. 4 to notionally illustrate the various contours on the radially outermost inner surface within the flow channel which constitute the diffuser, combustor and nozzle sections.
Figure 7:
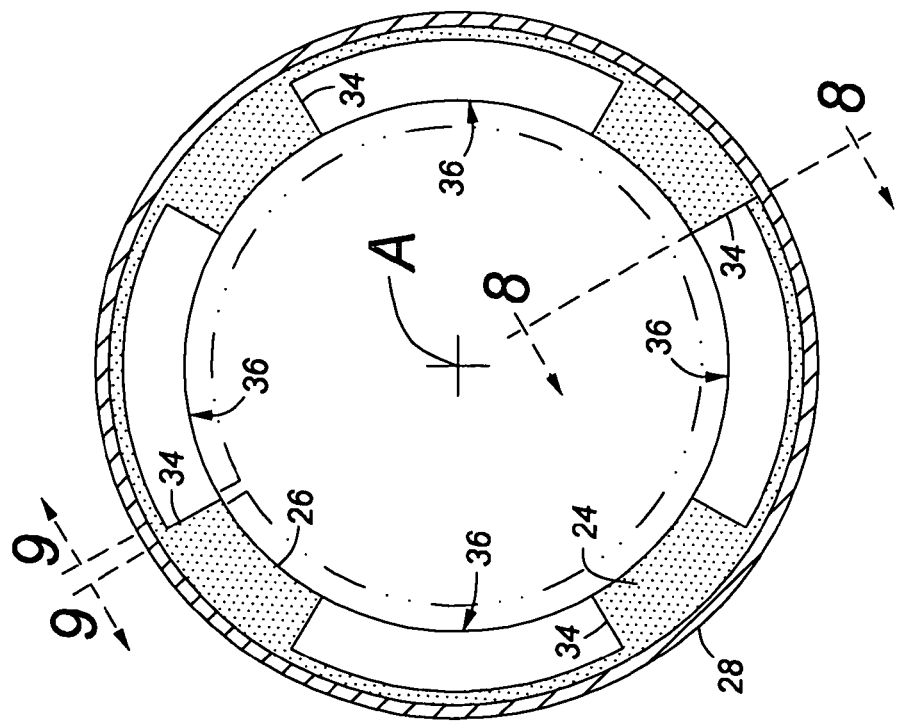
FIG. 7 is a front-elevation view of the rotor corresponding generally to that depicted in FIG. 4.
Figure 9:
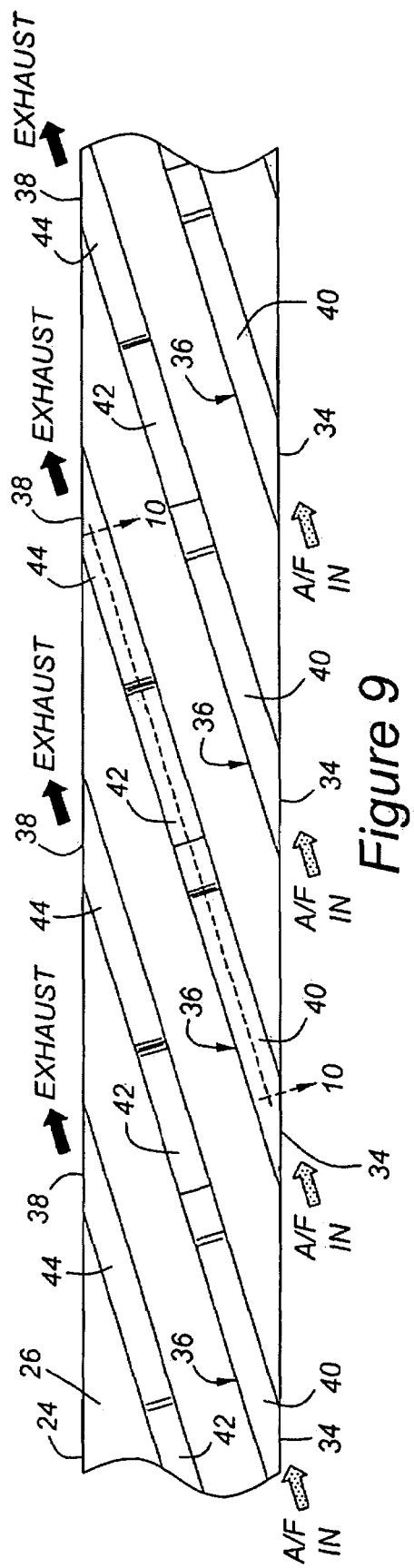
FIG. 9 is an inside diameter view of the rotor as viewed generally along lines 9-9 in FIG. 7, and depicted as if the rotor were cut along the axial direction and laid flat.

Because of the anticipated differing rates of thermal expansion which may be characteristic of the materials selected for the rotor 24 and spool 28 respectively, some accommodation should be given to prevent the unnecessary build-up of stresses between these otherwise joined components. Preferably, an unsegmented rotor 24 is joined to the spool 28 with a compliant bond 68 which may comprise a high-temperature resilient adhesive, as best shown in FIG. 8. Thus, differing expansion rates between the rotor 24 and spool 28 can be accommodated within the resilient adhesive 68. Of course, other methods can be employed to address the differing expansion rates between the rotor 24 and the spool 28 when these components are made from differing materials. In an alternative approach, the rotor 24 can be segmented so that differing rates of expansion relative to the spool 28 can be accommodated by a sufficient clearance space between the segments. In this example, the segments can be arcuate pieces so that the separation between segments transects one or more flow channels 36 in an axial direction. In a variation of this example, the segments can be helical with the separations formed between and parallel to the flow channels 36 so that there is no segmentation of any one flow channel 36. In this latter approach, as well as in the preferred embodiment, each flow channel 36 will comprise a continuous (non-segmented), unitary surface along its entire length between its axially forward inlet 34 and its axially rearward outlet 38 to minimize any reductions in overall thermal efficiency of the engine 10 which might otherwise result from segmentation through the flow channel 36.

In the preferred embodiment shown in the Figures, the stator 12 does not rotate with shaft 18 and therefore the material from which it is constructed is not subject to tensile stresses produced by centripetal acceleration. However, it will be understood by skilled persons that the invention can also be practiced by embodiments in which the stator 12 rotates about the same central axis A as does the rotor 24. In such embodiments, the stator 12 can be rotated in the same direction and at the same angular rotation rate as the rotor 24, for example by joining the stator 12 fixably to the shaft 18. This eliminates relative motion between the radially outward facing surface 14 of stator 12 and the radially inward facing surface 26 of rotor 24, thereby allowing any gap between these surfaces to remain substantially constant even as the rotation rate of shaft 18 is varied. This can allow for simpler methods to effectively seal this gap within the flow channels 36 to reduce leakage of working fluid through this gap. To substantially reduce tensile stresses within the high-temperature material from which the stator 12 is formed, in such an embodiment the stator 12 may no longer be fixably joined to stator frame 16, and instead may be fixably joined in a suitable manner to the rotor 24. The stator frame 16 then is unnecessary and can be eliminated. However, depending on the specific manner in which the stator 12 is joined to the rotor 24 in such an embodiment, assembly of the engine components to required tolerances may become more difficult than in the preferred embodiment, with resulting detrimental consequences that may outweigh any benefits of such an alternative embodiment.

The invention also contemplates a method for operating a Brayton-cycle rotary ramjet engine 10 within the confines of a helically elongated pass-through combustion chamber formed between a preferably stationary radially outward surface 14 and a rotating flow channel 36. The method comprises the steps of fixedly supporting the radially outward surface 14 about a central axis A, rotatably supporting one or more helical ramjet flow channels 36 about the central axis A and concentrically axially aligned with the radially outward surface 14, and rotating the flow channels 36 in a circular path about the exterior of the radially outward surface 14. For the reasons described above, by rotating the flow channels 36 (contained in the rotor 24) in an orbital path about the radially outward surface 14 (of the stator 12), numerous advantages and operating efficiencies can be achieved. Most notably, this arrangement enables use of high-temperature, low tensile strength materials like ceramic for the flow channel 36. In the subject method, air can be forcibly driven toward the axially forward inlets 34 by use of an impeller 66 or other air pumping device. Preferably, the step of forcibly driving the air includes manipulating the helical lead angle of air directed toward the axially forward inlets 34 to align generally parallel to the helical lead angle in each flow channel 36. This can be accomplished by carefully matching the geometry of the impeller 66 together with the rotational speed of the flow channels 36, or by properly configuring radial supports 56 in the form of guide vanes upstream of the flow channels 36. The method further includes introducing fuel into the air (or other oxidizer) upstream of the axially forward inlets 34. In the case of liquid fuels, the step of atomizing is accomplished through the fuel slinger 58 or other atomization technique.

The step of rotating the flow channels 36 results in a relative velocity between the flow channels 36 and the incoming gas which is greater than the ambient speed of sound. Such high-speed operation enables effective use of ramjet engine principles within the confines of a rotating configuration. By placing the rotor 24 in a predominantly compressive stress condition during engine 10 operation, the use of high-temperature, low tensile strength materials can be used to their greatest effect. This is accomplished by surrounding the rotor 24 with a spool 28 capable of preventing the development of tensile stresses within the rotor 24 of sufficient magnitude that could lead to failure of the high-temperature material from which rotor 24 is formed. The method preferably includes generating electrical power through operation of the engine 10 by coupling a generator 22 to the power shaft 18 either by a direct connection, by a transmission, or by any other means. However, uses for the engine 10 other than electricity generation may be contemplated. Furthermore, the method includes the step of forming a plurality of discrete, non-intersecting ramjet flow channels 36 in equal circumferential increments about the exterior of the radially outward surface 14. Thus, a balancing of forces is achieved so that the engine 10 can run in a smooth, continuous manner.

The subject engine 10 is based on an approach that eliminates the need for the bladed compressor and turbine found in traditional gas turbine engines, and replaces these components with a single (possibly segmented) supersonic rotating rotor 24 made of high-temperature materials and having integrated ramjet flow channels 36 contoured to provide gas dynamic compression, combustion, and expansion in a high-efficiency Brayton-cycle system. As compared with prior art designs, the subject flow channel 36 is fabricated in an inside-out design, meaning that the supersonic rotor 24 rotates around the outside of an inner stator 12. Preferably, but not necessarily, this stator 12 is stationary relative to the housing 46. All rotating parts are thus truly under compressive loading, via the restraining action of the spool 28, to exploit the significantly higher compressive versus tensile strength of ceramic, ceramic-metallic, and other high-temperature materials. Replacing the large bladed compressor and turbine mass of a prior art system with the subject orbiting rotor 24 thus enables dramatically higher power-to-weight ratios. Equally important, replacing the prior art turbine with the subject ramjet expansion nozzles 44 allows significantly higher combustor 44 exit gas temperatures ($T_3$) which provides for correspondingly higher thermal efficiencies in a Brayton-cycle analysis, and also provides higher mass-specific power output for a given engine mass.

The fuel slinger 58 might typically atomize liquid fuel into fine drops which issue into the air flow induced by the impeller 66 to provide a pre-mixed, pre-vaporized inflow to the helical, ceramic-lined, rotating ramjet flow channels 36. The combustion chamber 42 in each ceramic flow channel 36 provides stable combustion to create the radial impulse that drives the rotating hub design and produces the net shaft power to a generator 22 or other implement. By replacing the prior art compressor and turbine with a single supersonic rotating rotor 24, the subject invention also greatly reduces system complexity and fabrication costs, and enables significantly longer operating life. Benefits also include dramatically smaller size and weight for a given maximum power, higher net efficiency, reduced cost and increased life.

The required duct geometries established in the flow channels 36 are far simpler than prior art compressor or turbine blade rows, and can thus be more readily manufactured in high-temperature ceramic materials, such as silicon nitride, using advanced manufacturing methods. Furthermore, the simple duct geometries facilitate the use of rapid prototyping methods to design, model, test and fabricate the shaped rotor 24. Skilled persons will know to include Rayleigh and Fanno flow considerations in the flow channel 36 design to avoid thermal or frictional choking of the duct flow. An example of a small-scale engine 10 might have a rotor 24 having 5 cm radius rotating at 140,000 rpm to provide a relative Mach number of about 2.44 at the inlet 34 of the flow channels 36, for which the design supersonic diffuser 40 gives a compression ratio of about 15.7. Larger engines 10 may have slower rotor 24 rotation rates but maintain a sufficiently high relative Mach number at the inlet 34 to the flow channels 36 to provide supersonic inlet flow into the ramjet flow channels 36 with which to maintain high thermal efficiency and mass-specific power.

Skilled persons will recognize that, for a design of an engine 10 in which the rotor 24 diameter is smaller in comparison with a geometrically scaled engine 10 design, a greater rotation rate of rotor 24 will be needed for the smaller rotor diameter to achieve sufficient ram compression within the diffuser 40 and maintain acceptable engine performance. In general, when designing two geometrically scaled engines 10, their required rotation rates must differ in inverse proportion to their rotor 24 diameters to provide the same speed of the ramjet flow channels 36 relative to the gases flowing into their respective inlets 34. Skilled persons will also recognize that for a design of an engine 10 in which the rotor 24 diameter is smaller in comparison with a geometrically scaled engine 10 design, the differing rotation rates produce differing centripetal accelerations and correspondingly differing centrifugal forces on rotating parts in the two engine 10 designs. In general, the centripetal acceleration of corresponding points in two otherwise identical but geometrically scaled engine designs will differ in inverse proportion to their rotor 24 diameters when operating them so as to keep the same speed of the working gases relative into their respective inlets 34.

These scalings of the rotation rate and resulting centripetal accelerations with the rotor 24 diameter make evident the substantially greater stresses produced in rotating parts from miniaturization of a rotating ramjet engine. In an example of a large-scale engine 10 with rotor 24 having 1 meter radius rotating at 6,000 rpm, the peak centripetal acceleration of the rotor exceeds 40,000 g's. In the example of a small-scale engine 10 with a rotor 24 having 5 cm radius rotating at 140,000 rpm, the peak centripetal acceleration of the rotor exceeds 1,000,000 g's. This enormous centripetal acceleration creates large stresses within the materials from which the rotor 24 and other rotating parts are formed. However, an important advantage of the inside-out innovation taught by the present invention is that these stresses are primarily manifested in compressive form, rather than in tensile form. High-temperature materials, which are materials capable of substantially retaining their material strength even under sustained exposure to temperatures that are significantly higher than temperatures at which conventional materials (such as metals) substantially lose their material strength, typically have much higher material strength limits when subjected to compressive rather than tensile stresses. The present invention permits substantially greater use of desirable high-temperature materials (such as ceramics) in Brayton-cycle engines 10 configured as taught herein than is possible in engines configured as taught by the prior art.

Furthermore, frictional torque losses can be minimized by proper design of the gaps that separate rotating and non-rotating surfaces. At start-up, the generator 22 initially serves as a motor to drive rotor 24 to a moderate rotation rate, corresponding to a Mach number at which the inlets 34 move relative to the flow entering them, that is high enough (typically about 1.2) to provide sufficient compression in the diffuser 40 for the combustor 42 to provide net thrust along the flow channels 36. The resulting reaction torque provides subsequent spin-up of the rotor 24 to its nominal operating point (rotation rate) to provide net power output from the engine 10.

The major advantage inherent in the subject invention resides in the large reduction of system mass achieved by replacing the prior art bladed compressor and turbine with a simple supersonic hub 24 within which the compression-combustion-expansion ducts are integrated in one or more outer-orbiting flow channels 36. Additional advantages are realized in increased specific power and increased combustion efficiencies.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A Brayton-cycle rotary ramjet engine, said engine comprising:
   a stator having a generally annular radially outward surface centered about a central axis; and
   a rotor rotatably supported about and concentric with said central axis and axially aligned with said annular radially outward surface of said stator along said central axis, said rotor including a radially innermost surface opposing said annular radially outward surface of said stator and defining at least one helically extending ramjet flow channel radially recessed into said rotor from said innermost surface of said rotor, said at least one helically extending ramjet flow channel including an axially forward inlet and an axially rearward outlet, a radially outermost inner surface opposing said annular radially outward surface of said stator with contoured features on said radially outermost inner surface of said at least one helically extending ramjet flow channel between said axially forward inlet and said axially rearward outlet forming a diffuser section for slowing a flow of gases through said helically extending ramjet flow channel, a combustor section for igniting the flow of gases and a nozzle section for accelerating the flow of gases;
   said rotor and said helically extending ramjet flow channel in said rotor being disposed radially outwardly of said annular radially outward surface of said stator such that said rotor orbits about said stator and said central axis during operation of said engine.

2. The engine of claim 1 wherein said rotor has a tensile strength, further including a spool disposed about said rotor, said spool having a tensile strength greater than said tensile strength of said rotor wherein stresses induced by centrifugal expansion forces are transferred from said rotor to said spool.

3. The engine of claim 2 further including a compliant bond between said rotor and said spool.

4. The engine of claim 2 wherein said helically extending ramjet flow channel comprises a continuous, unitary surface between said axially forward inlet and said axially rearward outlet.

5. The engine of claim 2 wherein said rotor is fabricated from a material including ceramic.

6. The engine of claim 2 further including a shaft rotatably supported along said central axis and operatively coupled to said rotor.

7. The engine of claim 6 further including an electrical generator operatively coupled to said shaft.

8. The engine of claim 6 further including an impeller operatively coupled to said shaft for forcibly moving air toward said axially forward inlet of said helically extending ramjet flow channel.

9. The engine of claim 6 further including a fuel slinger operatively coupled to said shaft for discharging atomized fuel into a flow of air upstream of said axially forward inlet of said helically extending ramjet flow channel.

10. The engine of claim 6 further including a housing fixed relative to said stator and surrounding said rotor and said spool.

11. The engine of claim 10 wherein said housing includes an air intake disposed upstream of said axially forward inlet of said helically extending ramjet flow channel, and at least one guide vane within said housing between said air intake and said axially forward inlet of said helically extending ramjet flow channel.

12. The engine of claim 11 further including an impeller disposed in said housing and operatively connected to said shaft upstream of said guide vane, and a fuel slinger operatively connected to said shaft upstream of said axially forward inlet of said helically extending ramjet flow channel.

13. The engine of claim 12 further including at least one thrust bearing disposed between said shaft and said housing.

14. The engine of claim 11 wherein said helically extending ramjet flow channel has a helical lead angle, said guide vane having a helical lead angle generally corresponding to said lead angle of said helically extending ramjet flow channel so as to align the air flow at said axially forward inlet generally parallel with the lead angle of said helically extending ramjet flow channel.

15. The engine of claim 1 wherein said rotor includes a plurality of discrete, non-intersecting helically extending ramjet flow channels disposed in equal circumferential increments about said central axis, each of said helically extending ramjet flow channels having an axially forward inlet and an axially rearward outlet and contoured features between said axially forward inlet and said axially rearward outlet forming respective diffuser, combustor and nozzle sections thereal-ong.

16. The engine of claim 1 wherein said annular radially outward surface is generally cylindrical.

17. The engine of claim 1 further including a fuel slinger disposed upstream of said axially forward inlet of said helically extending ramjet flow channel and disposed downstream of an air intake of said engine.

* * * * *